United States Patent
Ishida

(10) Patent No.: US 7,360,570 B2
(45) Date of Patent: *Apr. 22, 2008

(54) LOW NOISE TIRE SUPPORT RING

(75) Inventor: Takaaki Ishida, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 134 days.

This patent is subject to a terminal disclaimer.

(21) Appl. No.: 11/236,501

(22) Filed: Sep. 28, 2005

(65) Prior Publication Data

US 2006/0108038 A1    May 25, 2006

(30) Foreign Application Priority Data

Nov. 25, 2004  (JP) .............................. 2004-340823

(51) Int. Cl.
  *B60C 17/00* (2006.01)
  *B60C 17/04* (2006.01)
  *B60C 5/00* (2006.01)

(52) U.S. Cl. .................... 152/516; 152/152; 152/155; 152/157; 152/158; 152/520

(58) Field of Classification Search ............... 152/152, 152/155, 157, 158, 516, 520
See application file for complete search history.

(56) References Cited

U.S. PATENT DOCUMENTS 5,891,279 A    4/1999   Lacour 7,188,649 B2 *  3/2007  Ishida et al. ................ 152/158

FOREIGN PATENT DOCUMENTS

| DE | 101 55 584 A1 | 5/2003 |
|---|---|---|
| EP | 1 356 958 A1 | 10/2003 |
| EP | 1 582 379 A1 | 10/2005 |
| JP | 10-6721 | 1/1989 |
| JP | 8-504389 A | 5/1996 |
| JP | 2003-502200 A | 1/2003 |
| JP | 2003-510209 A | 3/2003 |
| WO | WO-94/13498 A1 | 6/1994 |
| WO | WO-00/76791 A1 | 12/2000 |
| WO | WO-01/23195 A1 | 4/2001 |

* cited by examiner

*Primary Examiner*—Justin R. Fischer
(74) *Attorney, Agent, or Firm*—Birch, Stewart, Kolasch & Birch, LLP

(57) ABSTRACT

A tire support ring for pneumatic tires in the event of loss of inflation pressure is disclosed. The support ring comprises an annular main body and a plurality of noise dampers. The main body made is made of an elastic material and provided on both sides thereof with a plurality of holes each having a pair of opposite radially-extending side surfaces. The noise damper is made of a spongy material and inserted into the hole such that gaps of from 2.0 to 10.0 mm are formed between the side surfaces and the damper. The hole has a closed end, and in the hole, a hollow space is remained behind the inserted noise damper.

22 Claims, 5 Drawing Sheets

LOW NOISE TIRE SUPPORT RING

The present invention relates to a support ring for pneumatic tires in the event of loss of inflation pressure, more particularly to a support ring including noise dampers capable of improving noise performance as well as runflat performance.

Heretofore, various runflat tire systems by which, even if the tire goes flat, it is possible to travel for a practical long distance have been proposed, and nowadays, in the case of runflat tire systems employing support rings, a runflat distance reaches to several hundred kilometers even under a relatively high running speed of up to about 80 km/hr. such techniques are disclosed in for example, the Japanese patent application publication Nos. H08-504389 (WO 94/13498 A1), 10-6721 (U.S. Pat. No. 5,891,279 A), 2003-502200 (WO 00/76791 A1) and 2003-510209 (WO 01/023195).

On the other hand, recently, as the mechanical noise from automobiles especially passenger cars is greatly reduced, pneumatic tires for passenger cars are strongly required to reduce their noise. This is also the case in the runflat tire systems.

For the normal tire systems, many propositions to use a noise damper made of a sponge-like material attached to the inner surface of the tire tread portion or the central portion of the wheel rim have been made as the countermeasures for one of major factors of the tire noise which is a circumferential resonance of annular air in the tire cavity which causes a resonance peak in a frequency range of from 50 to 400 Hz according to the tire size. If such a damper is attached to the inner surface of the tire in the runflat tire systems employing support rings, there is a possibility that a lubricant applied to the tire inner surface to reduce frictions between the tire inner surface and support ring is sopped up by the damper. This is not preferable in terms of the noise damping effect, the amount of lubricant to be used, a weight increase in the tread portion, the rotational balance of the tire, bonding between the tire and damper and the like. In the case of wheel rim, on the other hand, it is very difficult or almost impossible to attach the damper to the wheel rim together with the tire support ring.

It is therefore, an object of the present invention to provide a tire support ring, by which tire noise is reduced without deteriorating other performances, and further it is possible to boost ventilation in the support ring to improve the runflat performance.

According to the present invention, a tire support ring comprises an annular main body and a plurality of noise dampers, wherein the annular main body is made of an elastic material and provided on both sides thereof with a plurality of holes each having a radially outer surface, a radially inner surface and a pair of opposite radially-extending side surfaces, and the noise dampers are made of a spongy material and inserted into the holes such that gaps are formed between the side surfaces and the dampers.

Embodiments of the present invention will now be described in detail in conjunction with the accompanying drawings.

Figure 1:
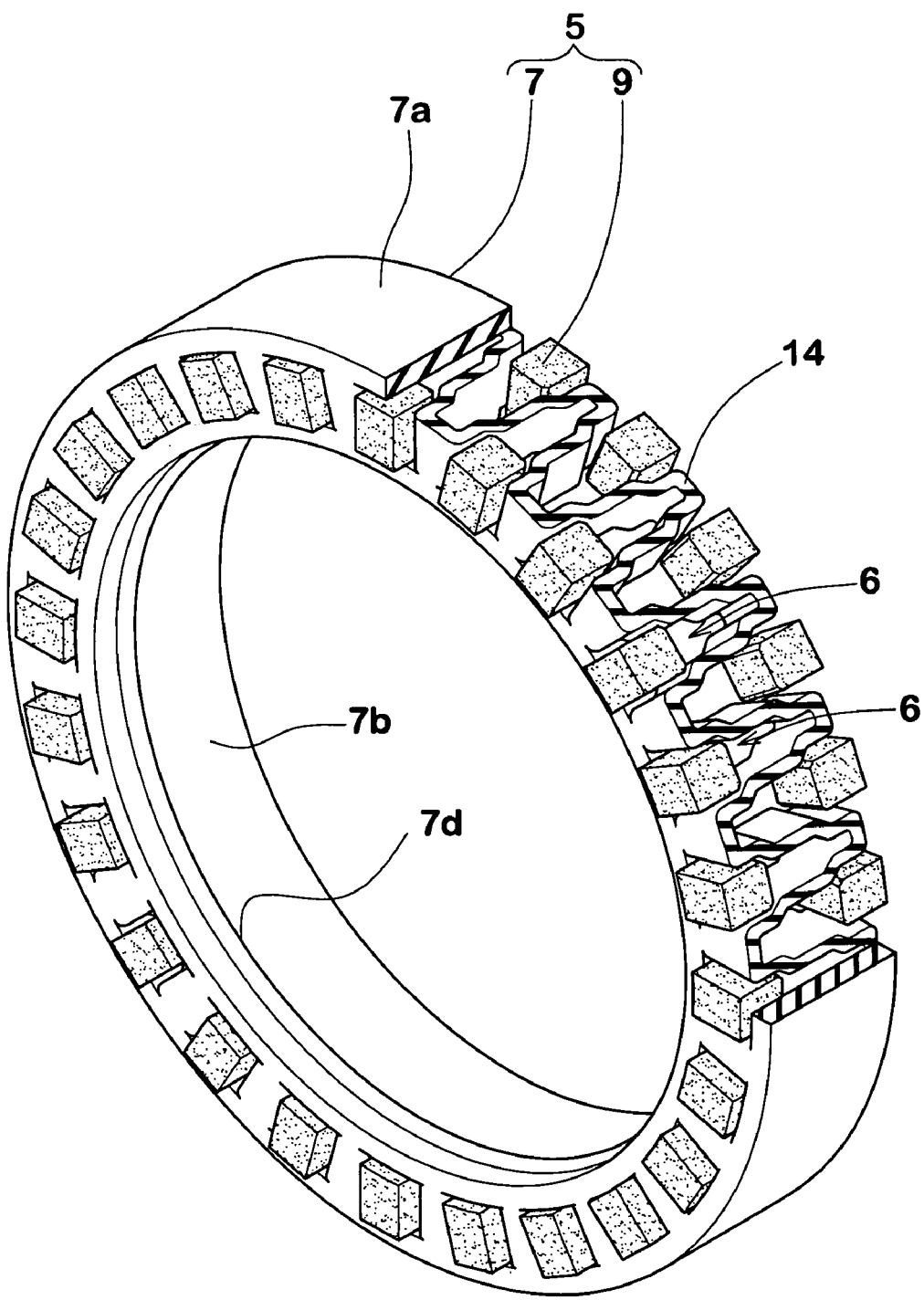
FIG. 1 is a perspective view of a tire support ring according to the present invention.

According to the present invention, a tire support ring 5 comprises an annular main body 7 and noise dampers 9 as shown in FIG. 1.

Figure 2:
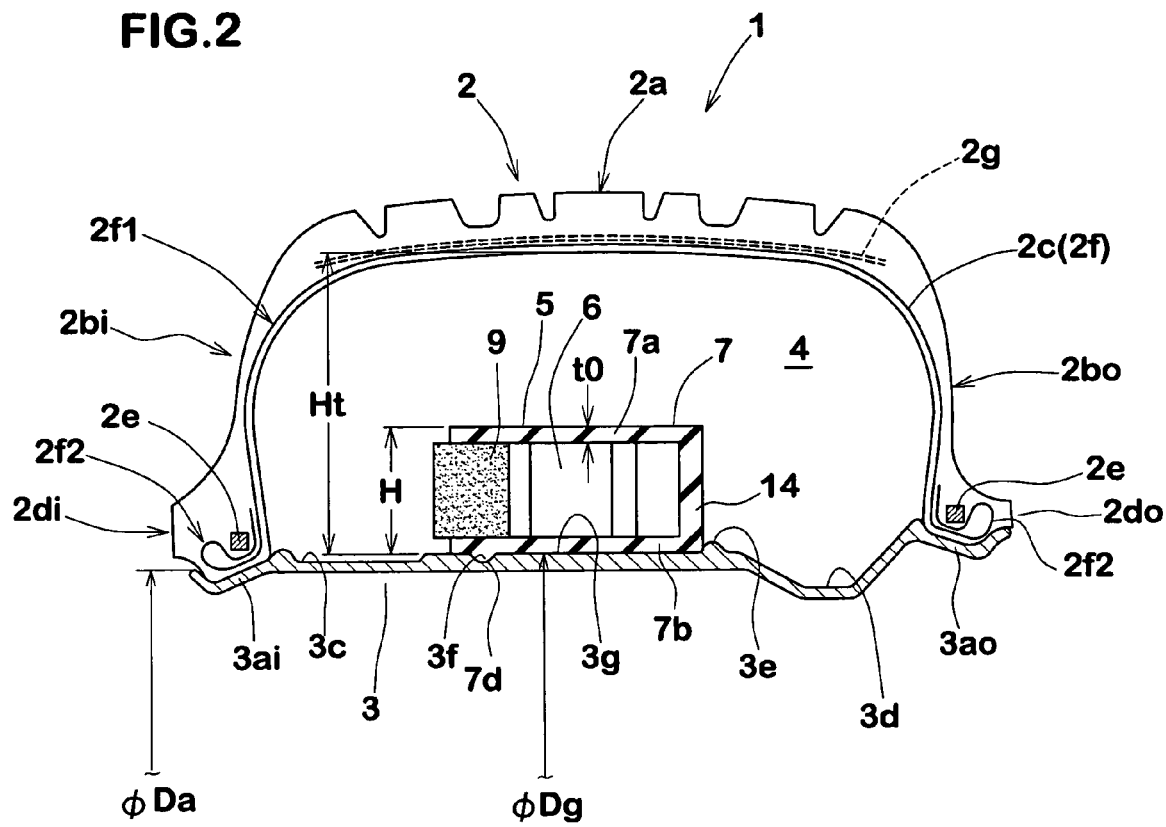
FIG. 2 is a cross sectional view of an assembly of a pneumatic tire, a wheel rim and the tire support ring.

The support ring 5 is, as shown in FIG. 2, mounted on a wheel rim 3 on which a pneumatic tire is mounted so that the support ring 5 is disposed within the tire cavity 4. In this embodiment, the tire is a radial passenger car tire having size 225-680R460A for which rim size is 225×460A.

The pneumatic tire 2 has a tread portion 2a, a pair of sidewall portions 2bi and 2bo, and a pair of bead portions 2di and 2do, and the tire 2 comprises: a carcass 2c composed of at least one ply 2f of radially arranged cords extending between the bead portions through the tread portion and sidewall portions; a bead core 2e disposed in each of the bead portions; and a tread reinforcing belt 2g disposed radially outside the carcass 2c in the tread portion 2a. The inner surface of the tire is covered with an inner liner made of air impermeable rubber, and a lubricant agent is applied thereto.

The belt 2g includes a breaker and optionally a band. The breaker comprises two cross plies which are in this example made of steel cords.

In this embodiment, the carcass 2c consists of the single ply 2f. This ply 2f is, in each bead portion 2di and 2do, once extended axially outwardly through beneath the bead core and then, on the axially outside of the bead core, turned radially outwardly back to the axially inside of the bead core, passing through beneath the bead core, so that a loop 2f2 filled with rubber is provided on each side of the carcass ply main portion 2f1, whereby the carcass ply 2f is secured to the bead cores.

The wheel rim 3 comprises: a bead seat 3ai with a flange for the bead portion 2di; a bead seat 3ao with a flange for the bead portion 2do; a support-ring-mounting portion 3g in the axial center of the bead seats; a rim well 3d formed between the support-ring-mounting portion 3g and the bead seat 3ao which is used when mounting the tire; a reduced diameter portion 3c formed between the support-ring-mounting portion 3g and the bead seat 3ai which is used when mounting the support ring 5; a circumferentially extending hump 3e formed along one of the axial edges of the support-ring-mounting portion 3g on the rim well side; and a circumferentially extending groove 3f formed within the axial width of the support-ring-mounting portion 3g near the other axial edge thereof.

The mounting portion 3g has a substantially cylindrical surface, and the groove 3f and hump 3e are provided to prevent an axial displacement of the tire support ring.

In this embodiment, unlike the conventional bead seats, the bead seats 3ai and 3ao are tapered axially outwards, and the entirety of the rim flange is inclined towards the axially outside contrary to the conventional flanges whose main portion contacting with the bead are almost perpendicular to the axial direction. Further, as the inside diameter of the bead portion 2di is smaller than that of the bead portion 2do, the inner bead seat 3ai is accordingly made smaller in diameter than the outer bead seat 3ao. The diameter Da at the outer edge of the rim flange of the inner bead seat 3ai is smaller than the outer diameter Dg of the support-ring-mounting portion 3g. The outer diameter Dg of the support-ring-mounting portion 3g is slightly larger than the inner diameter of the annular main body 7 of the support ring 5 so as to tightly fit with each other.

When mounted on the rim, the annular main body 7 comes into contact with the hump 3e and thus it is positioned in its place. Further, a protrusion 7d formed on the radially inner surface of the main body 7 engages with the above-mentioned groove 3f in order to prevent axial displacement.

The radial height H of the annular main body 7 is set in a range of from 35 to 65%, preferably 40 to 58%, more preferably 40 to 50% of the height Ht of the tire cavity. The height Ht is a radial distance from the cylindrical surface of the support-ring-mounting portion 3g to the radially outermost point of the tire inner surface under the normally-inflated unloaded condition of the tire. This condition is such that the tire is mounted on the wheel rim and inflate to a standard pressure but loaded with no tire load. The standard pressure is the maximum air pressure for the tire specified in the Air-pressure/Maximum-load Table or similar list provided by standard organization, i.e. JATMA (Japan and Asia), T&RA (North America), ETRTO (Europe), STRO (Scandinavia) and the like. For example, the standard pressure is the "maximum air pressure" in JATMA, the "Inflation Pressure" in ETRTO, the maximum pressure given in the "Tire Load Limits at various Cold Inflation Pressures" table in TRA or the like. In the case of passenger car tires, however, 180 kPa is uniformly used as the standard pressure.

The annular main body 7 is made of an elastic material. In this embodiment, rubber or rubbery polymer, e.g. polyurethane rubber, polybutadiene rubber, EPDM and the like is used. The JIS-D hardness thereof is set in a range of from 45 to 60 degrees, and the loss tangent (tan delta) at a temperature of 100 deg. C. is in a range of from 0.02 to 0.08.

The annular main body 7 comprises a radially outer annular part 7a, a radially inner annular part 7b and a supporting wall 14 therebetween. In this example, the annular main body 7 is formed as a single-piece of polyurethane rubber, utilizing injection molding.

The outer annular part 7a has a cylindrical outer surface which comes into contact with the inner surface of the tire tread portion 2a in the event of loss of inflation pressure.

The inner annular part 7b has an inner surface adapted to the support-ring-mounting portion 3g and defining the above-mentioned inner diameter of the annular main body 7.

The supporting wall 14 extends radially from the inner annular part 7b to the outer annular part 7a and, in the circumferential direction, supporting wall 14 extends continuously in a zigzag fashion. As a result, a large number of holes 6 are formed on both sides of the annular main body 7 in a staggered manner. If the total volume of the holes 6 is excessively increased, it becomes difficult to maintain the rigidity, strength and durability necessary for supporting the tire load. Therefore, the total volume of the holes 6 is set in a range of from 20 to 50% of the gross volume of the annular main body 7.

Figure 5:
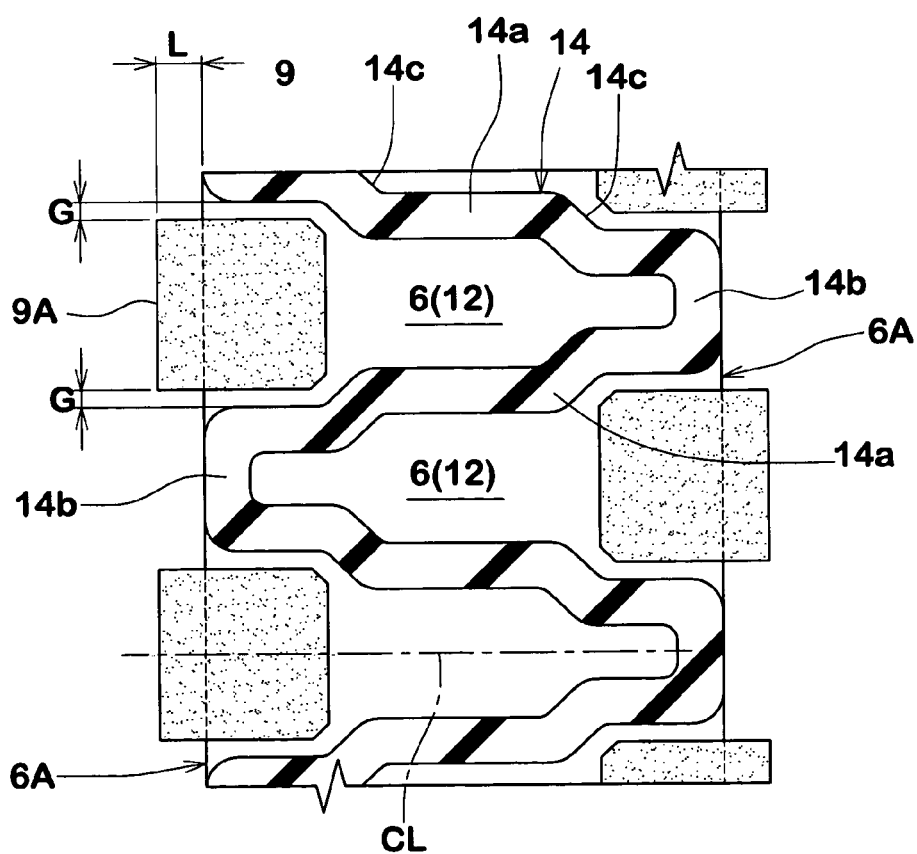
FIG. 5 is a cross sectional view taken along line A-A in FIG. 4.

In this embodiment, as best seen in FIG. 5, the zigzag supporting wall 14 is made up of small circumferential walls 14b disposed along the axial edges of the inner annular part 7b, and alternate traverse walls 14a extending obliquely from one side to the other side of the annular main body 7 to connect the ends of the circumferential walls 14b. Thus, each hole 6 has a radially outer surface, a radially inner surface, a pair of opposite radially-extending side surfaces, and an inner end surface, which are defined by the outer annular part 7a, the inner annular part 7b, two adjacent traverse walls 14a, and one circumferential wall 14b, respectively.

As the two oblique traverse walls 14a are inclined towards the opposite circumferential directions, the circumferential width and accordingly the cross sectional area perpendicular to the rotational axis decrease gradually from its outer open end to the inner closed end. The cross sectional shape of the holes is substantially rectangular, and in this embodiment, the lengths of the four sides are in a range of about 30 mm to about 40 mm at the opening 6A of the hole 6.

Figure 6:
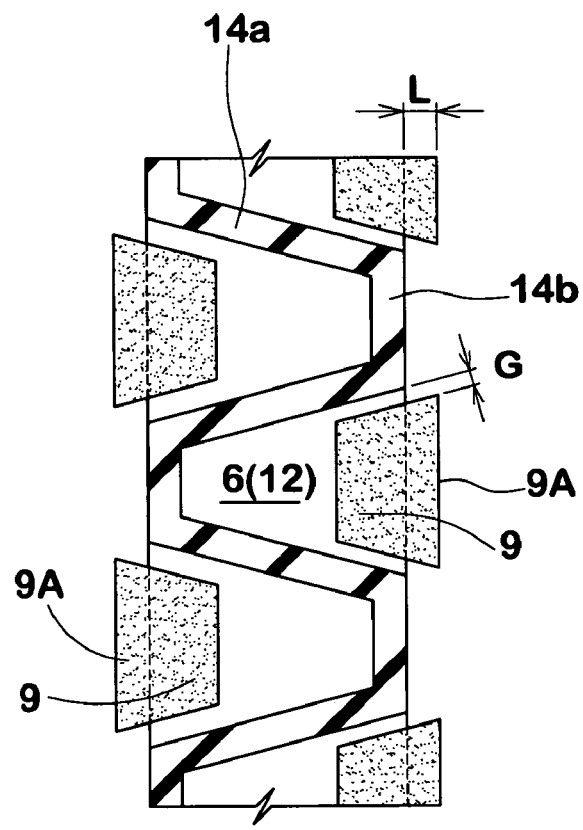
FIGS. 6 and 7 are cross sectional views each showing another example of the tire support ring.

In this embodiment, each of the oblique traverse walls 14a has one or more steps 14c during the course from one side to the other side of the annular main body 7. It is however, also possible to form the oblique traverse wall 14a in a straight configuration without the step 14c as shown in FIG. 6. Furthermore, in stead of the oblique traverse walls 14a, axially extending traverse walls 14a may be employed as shown in FIG. 7.

In any case, most of the holes 6, usually all of the holes are provided with the noise dampers 9.

Figure 7:
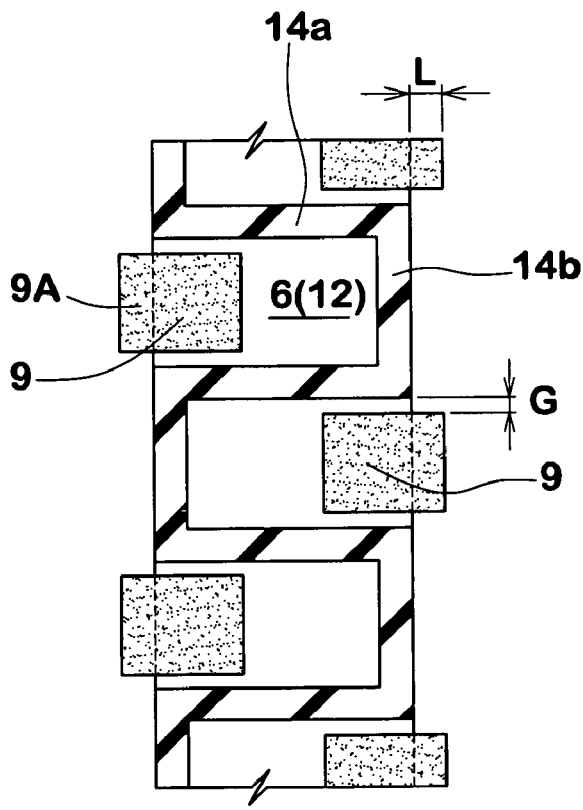

The noise damper 9 is made of a spongy material with a smaller depth than the hole 6 so that a hollow space 12 remains behind the inserted damper 9 as shown in FIGS. 5-7 to promote heat release from the wall 14. In the case of FIGS. 5 and 7, the shape of the noise dampers 9 are almost cubic. In FIG. 6, the shape is a trapezoid when viewed in the radial direction, but when viewed in the circumferential direction, it is a rectangle.

As to the spongy material, a multi-cellular material of a closed-cell or isolated-cell type may be used. But a multi-cellular material of an open-cell type is preferred. For example, synthetic resin sponges such as ether based polyurethane sponge, ester based polyurethane sponge, polyethylene sponge and the like; rubber sponges such as chloroprene rubber sponge (CR sponge), ethylene-propylene rubber sponge (EDPM sponge), nitrile rubber sponge (NBR sponge) and the like are preferably used.

In view of sound absorption, durability, light weight nature and controllability of foaming, preferably used are polyurethane sponge, especially ether based polyurethane sponge, and polyethylene sponge.

To obtain a sufficient high percentage of void to improve noise damping effect and minimize the necessitated weight increase and adverse effects on the rotational balance, the density of the spongy material is set in the range of at most 0.1 g/cu.cm, preferably less than 0.06 g/cu.cm, more preferably less than 0.04 g/cu.cm.

For example, Product number E35 of MARUSUZU CO., LTD. is a commercially available ether based polyurethane sponge having a density of 0.035 g/cu.cm.

In any case, it is necessary for the spongy material to withstand a temperature of at least 140 degrees C. without fusion.

In the hole 6, between the outer annular part 7a and the inner annular part 7b, the damper 9 is compressed in the radial direction in order to reduce friction between the contacting surfaces of the damper 9 and the annular main body 7. If the compression ratio is less than 70%, as the percentage of void decreases, the noise damping effect is decreased. Therefore, the compression ratio is set in a range of not less than 70%, preferably more than 80%, but not more than 95%, preferably less than 90% to obtain a significant contact pressure. Such compression is however, not always necessary when the contacting surfaces are fixed to each other by means of adhesive agent, pressure sensitive adhesive, double-sided adhesive tape or the like.

Figure 4:
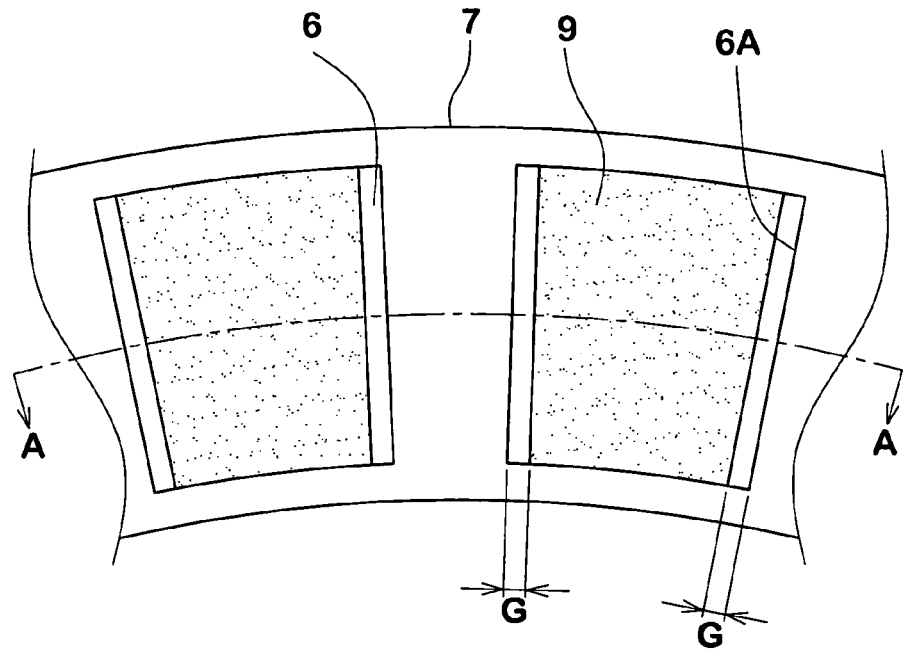
FIG. 4 is a partial side view of the tire support ring.

The most important thing is to provide certain gaps G between the noise dampers 9 and the supporting wall 14. One reason is to prevent their friction and resultant heat generation. Another reason is to promote ventilation of the air in the deep portion the hole by making positive use of pumping effect during runflat situations. During runflat situations, the annular main body is repeatedly compressed in the radial direction in the load applied portion, causing complex deformation of the supporting wall 14 and change in the volume of the hole. Accordingly, if there is no gap, frictional heat is generated and the durability of the annular main body 7 is rapidly decreased. But, in this invention there are stable gaps G. Therefore, according to the holes' volume changes repeating during running, the holes breathe and the air jetted into the hole stirs the air in the hole and then part of the stirred air is discharged. These actions are repeated, and heat accumulation is prevented. If the gap G is too narrow, such ventilation becomes insufficient. The gap G (or slit width) is therefore, at least 2.0 mm, preferably more than 3.0 mm. However, if the gap G is too wide, the force of the jets decreases and the breathing is lessened. Thus, it is difficult to reduce the heat accumulation. Therefore, the gap G is at most 10.0 mm, preferably less than 8.0 mm. In this embodiment, as shown in FIG. 4, from the radially inner end to the radially outer end, the gap is a constant value of 3.5 mm.

As explained above, the noise dampers 9 disposed with the specific gaps have a role in the accelerating of the ventilation as well as decreasing of the noise.

Figure 8:
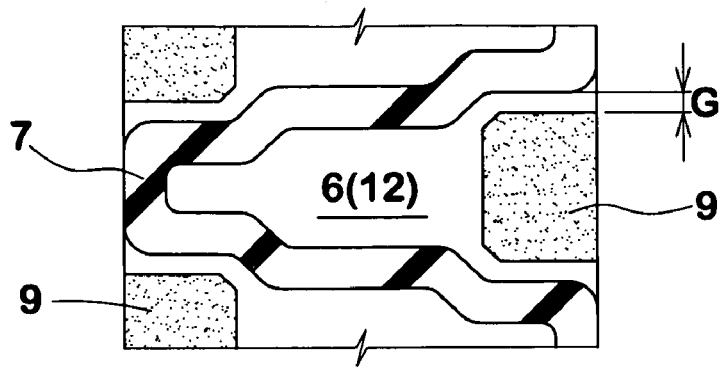
FIG. 8 is a cross sectional view showing a modification of the tire noise support ring shown in FIG. 1.

As the noise damper 9 inserted in a hole 6 blocks a major part of the opening 6A, the damper 9 can prevent the air in the hole 6 from being excited by the external noise vibration, and high-frequency resonance of the hole is avoided to reduce the noise in such a high frequency band. For this purpose therefore, it is possible that the entirety of the damper 9 is placed within the hole 6 as shown in FIG. 8. However, from the aspect of the noise reduction especially prevention of the tire cavity's resonance, it is desirable that a broad surface area of the dampers is exposed to the air in the tire cavity. Thus, it is preferable that the noise dampers 9 protrude from the holes 6. As the protruding parts 9A occur at certain intervals in the circumferential direction, in other words, as the damper does not continue in the circumferential direction, the occurrence of standing wave in the circumferential direction is effectively prevented to reduce the noise.

Figure 3:
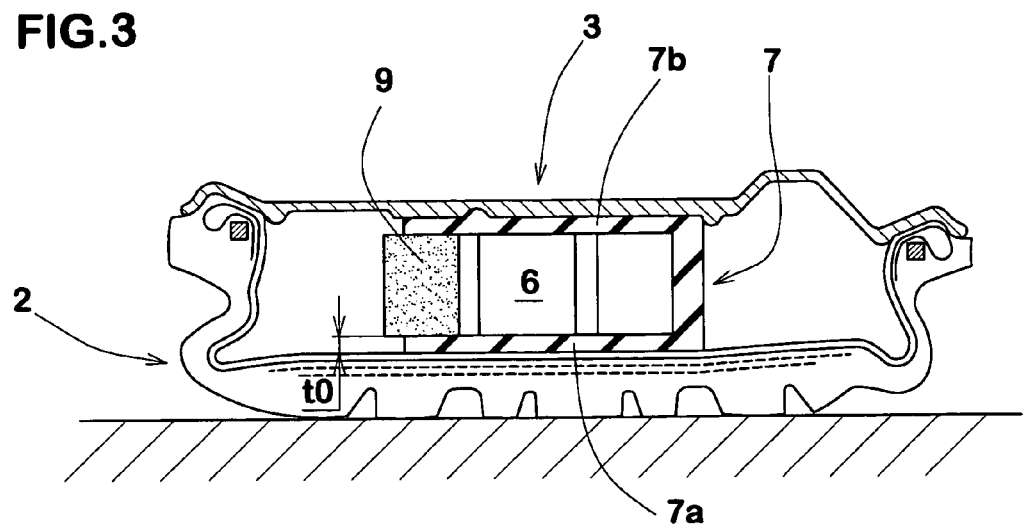
FIG. 3 is a cross sectional view of the assembly in the ground contacting patch in the event of loss of inflation pressure.
Figure 9:
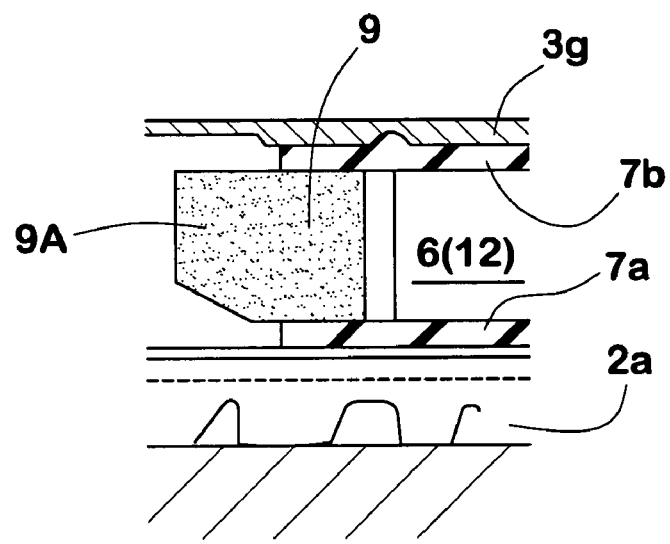
FIGS. 9 and 10 are cross sectional views each showing another example of the noise damper, taken along a plane including the rotational axis of the tire support ring.
Figure 10:
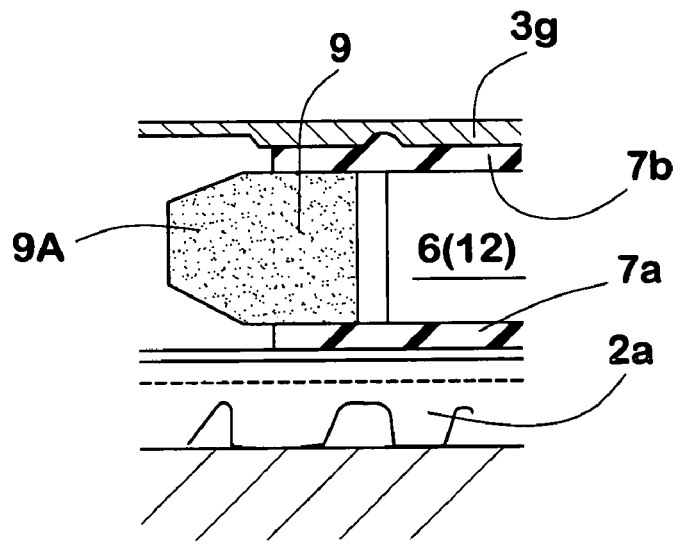

If the protruding amount L of the protruding parts 9A is too large, however, it increases the likelihood that the protruding parts 9A come into contact with the tire inner surface during runflat situations. This is not preferable because the damper material sops up the lubricant agent which is applied to the tire inner surface to decrease the friction between the tire and the annular main body 7 during runflat situation. Therefore, the protruding amount L is set in a range of not more than 3 times, preferably less than 1.5 times the thickness (to) of the radially outer annular part 7a when the radially outer surface of the damper 9 is substantially flat in the cross section including the rotational axis as shown in FIG. 3. For example, the protruding amount L in this embodiment is 10 mm. However, in the case that other cross sectional shapes of which outer corner is cut off as shown in FIGS. 9 and 10 are adopted, the protruding amount L may be increased over the above-mentioned upper limit of more than 3 times the thickness (to) while preventing the sopping-up of the lubricant agent. In view of prevention of the circumferential standing wave, the increasing of the protruding amount L is preferred. In any case, for the effective noise reduction as well as fixation of the damper material, it is preferable that the volume V2 of the noise dampers 9 which occupies the hole 6 in other words inserted volume is not less than 20% of the volume V1 of the hole 6.

As described above, in the tire support ring according to the present invention, as the noise dampers are provided together with the gaps, the tire cavity and holes are prevented from being resonated and further the ventilation of the holes can be promoted. As a result, the tire noise is reduced and the durability and runflat performance can be improved.

The invention claimed is:

1. A tire support ring comprising
an annular main body made of an elastic material and provided on both sides thereof with a plurality of holes each having a pair of opposite radially-extending side surfaces, and
a plurality of noise dampers made of a spongy material and inserted into the holes such that gaps are formed between the side surfaces and the dampers.

2. The tire support ring according to claim 1, wherein said gaps are in a range of from 2.0 to 10.0 mm.

3. The tire support ring according to claim 1, wherein each of the holes into which the noise dampers are inserted has a closed end, and in each said hole, a hollow space is remained behind the inserted noise damper.

4. The tire support ring according to claim 1, wherein the noise damper are entirely placed within the respective holes.

5. A tire support ring comprising
an annular main body made of an elastic material and provided on both sides thereof with a plurality of holes each having a pair of opposite radially-extending side surfaces, and
a plurality of noise dampers made of a spongy material and inserted into the holes such that the noise damper inserted into each said hole has a part placed in the hole, and the remaining part protruding from the opening of the hole.

6. The tire support ring according to claim 1, wherein the density of the spongy material is at most 0.1 g/cu.cm in its stress free state.

7. The tire support ring according to claim 1, wherein said holes provided on both sides of the main body are staggered.

8. The tire support ring according to claim 1, wherein each of the holes into which the noise dampers are inserted has an open end and a closed end and is gradually decreased in the cross sectional area from the open end to the closed end thereof.

9. A combination of a pneumatic tire, a wheel rim on which the tire is mounted, and the tire support ring according to claim 1, wherein the wheel rim is provided between its bead seats with a mounting portion for the tire support ring adapted to an inner circumference of the annular main body.

10. A combination of a wheel rim on which a pneumatic tire is mountable, and the tire support ring according to claim 1, wherein the wheel rim is provided between its bead seats with a mounting portion for the tire support ring adapted to an inner circumference of the annular main body.

11. A combination of a pneumatic tire and the tire support ring according to claim 1, wherein the pneumatic tire has a hollow defining a closed cavity into which the tire support ring is disposed, and a radial height H of the annular main body is in a range of from 35 to 65% of a radial height Ht of the tire cavity.

12. The tire support ring according to claim 2, wherein each of the holes into which the noise dampers are inserted has a closed end, and in each said hole, a hollow space is remained behind the inserted noise damper.

13. A combination of a pneumatic tire, a wheel rim on which the tire is mounted, and the tire support ring according to claim 2, wherein the wheel rim is provided between its bead seats with a mounting portion for the tire support ring adapted to an inner circumference of the annular main body.

14. A combination of a pneumatic tire, a wheel rim on which the tire is mounted, and the tire support ring according to claim 3, wherein the wheel rim is provided between its bead seats with a mounting portion for the tire support ring adapted to an inner circumference of the annular main body.

15. A combination of a pneumatic tire, a wheel rim on which the tire is mounted, and the tire support ring according to claim 4, wherein the wheel rim is provided between its bead seats with a mounting portion for the tire support ring adapted to an inner circumference of the annular main body.

16. A combination of a pneumatic tire, a wheel rim on which the tire is mounted, and the tire support ring according to claim 5, wherein the wheel rim is provided between its bead seats with a mounting portion for the tire support ring adapted to an inner circumference of the annular main body.

17. A combination of a pneumatic tire, a wheel rim on which the tire is mounted, and the tire support ring according to claim 6, wherein the wheel rim is provided between its bead seats with a mounting portion for the tire support ring adapted to an inner circumference of the annular main body.

18. A combination of a pneumatic tire, a wheel rim on which the tire is mounted, and the tire support ring according to claim 7, wherein the wheel rim is provided between its bead seats with a mounting portion for the tire support ring adapted to an inner circumference of the annular main body.

19. A combination of a pneumatic tire, a wheel rim on which the tire is mounted, and the tire support ring according to claim 8, wherein the wheel rim is provided between its bead seats with a mounting portion for the tire support ring adapted to an inner circumference of the annular main body.

20. A combination of a wheel rim on which a pneumatic tire is mountable, and the tire support ring according to claim 2, wherein the wheel rim is provided between its bead seats with a mounting portion for the tire support ring adapted to an inner circumference of the annular main body.

21. A tire support ring comprising:
an annular main body made of an elastic material and provided on both sides thereof with a plurality of holes each having a pair of opposite radially-extending side surfaces, a radially inner surface and a radially outer surface, and
a plurality of noise dampers made of a spongy material and inserted into the holes such that the noise damper inserted into each said hole contacts with the radially inner surface and the radially outer surface of the hole, but a gap is formed between the side surfaces of the hole and the noise damper, wherein the gap is greater than 2.0 mm.

22. The tire support ring according to claim 21, wherein the gap is in a range of from 2.0 to 10.0 mm.

* * * * *